(12) United States Patent
Huang et al.

(10) Patent No.: US 12,266,983 B2
(45) Date of Patent: Apr. 1, 2025

(54) MOTOR-INTEGRATED RESOLVER TRANSFORMER SIMULATION DEVICE AND SIMULATION METHOD THEREOF

(71) Applicant: Changzhou Huaxuan Sensing Technology Co., Ltd, Jiangsu (CN)

(72) Inventors: Yan Huang, Jiangsu (CN); Weifeng Ma, Jiangsu (CN)

(73) Assignee: CHANGZHOU HUAXUAN SENSING TECHNOLOGY CO., LTD, Changzhou (CN)

( * ) Notice: Subject to any disclaimer, the term of this patent is extended or adjusted under 35 U.S.C. 154(b) by 0 days.

(21) Appl. No.: 18/759,714

(22) Filed: Jun. 28, 2024

(65) Prior Publication Data

US 2025/0007359 A1    Jan. 2, 2025

(30) Foreign Application Priority Data

Jun. 30, 2023    (CN) .......................... 202310786234.2

(51) Int. Cl.
| | |
|---|---|
| *H02K 11/21* | (2016.01) |
| *H02K 5/14* | (2006.01) |
| *H02K 13/10* | (2006.01) |
| *H02P 27/04* | (2016.01) |

(52) U.S. Cl.
CPC .............. *H02K 11/21* (2016.01); *H02K 5/14* (2013.01); *H02K 13/10* (2013.01)

(58) Field of Classification Search
CPC .......... H02K 11/21; H02K 13/10; H02K 5/14; H02K 5/143; H02K 5/141; H02K 5/148; H02P 27/045; H02P 27/04

USPC .............. 310/68 B, 238–242, 245, 247–249; 318/800

See application file for complete search history.

(56) References Cited

U.S. PATENT DOCUMENTS

| | | | | |
|---|---|---|---|---|
| 4,366,404 A | * | 12/1982 | Ziegler .................. | H01R 39/40 310/239 |
| 2003/0164652 A1 | * | 9/2003 | Tamura .................. | H02K 11/21 310/68 B |

(Continued)

FOREIGN PATENT DOCUMENTS

| | | |
|---|---|---|
| CN | 1164140 A | 11/1997 |
| CN | 1689212 A | 10/2005 |
| CN | 1700533 A | 11/2005 |

(Continued)

OTHER PUBLICATIONS

Machine translation of CN-218728730-U. (Year: 2023).*

(Continued)

*Primary Examiner* — Michael Andrews
(74) *Attorney, Agent, or Firm* — NKL LAW; Allen Xue (57) ABSTRACT

The present invention involves in the technical field of resolver transformers, specifically in a motor-integrated resolver transformer simulation device and the simulation method thereof. The present invention obtains the current sinusoidal and cosinusoidal signals of a motor module through a resolver transformer module provided therein, and compare them with the excitation signals inputted by a motor controller, so as to determine whether the resolving circuit of the motor controller is faulty, and, by improving the brush device of the motor module, the service life of the motor module is increased and the testing cost is reduced.

3 Claims, 8 Drawing Sheets

(56) References Cited

U.S. PATENT DOCUMENTS

| | | | | |
|---|---|---|---|---|
| 2005/0121995 A1* | 6/2005 | Nakajima | ............ | H02K 7/1166 |
| | | | | 310/239 |
| 2010/0259135 A1* | 10/2010 | Shimamura | .............. | H02K 5/10 |
| | | | | 310/68 B |

FOREIGN PATENT DOCUMENTS

| CN | 2809985 | Y | 8/2006 | |
|---|---|---|---|---|
| CN | 201204506 | Y | 3/2009 | |
| CN | 101816105 | A | 8/2010 | |
| CN | 102906989 | A | 1/2013 | |
| CN | 202770389 | U | 3/2013 | |
| CN | 104320024 | A | 1/2015 | |
| CN | 206060417 | U | 3/2017 | |
| CN | 107863916 | A | 3/2018 | |
| CN | 207623708 | U | 7/2018 | |
| CN | 208174470 | U | 11/2018 | |
| CN | 109378667 | A | 2/2019 | |
| CN | 110301087 | A | 10/2019 | |
| CN | 110303639 | A | 10/2019 | |
| CN | 111697782 | A | 9/2020 | |
| CN | 214754558 | U | 11/2021 | |
| CN | 113820599 | A | 12/2021 | |
| CN | 113890282 | A | 1/2022 | |
| CN | 114039459 | A | 2/2022 | |
| CN | 115580065 | A | 1/2023 | |
| CN | 218728730 | U * | 3/2023 | |
| DE | 69529924 | | 4/2003 | |
| EP | 0099158 | A1 | 1/1984 | |
| FR | 691809 | A | 10/1930 | |
| FR | 2558012 | A1 | 7/1985 | |
| GB | 2302763 | A | 1/1997 | |
| JP | H0529271 | U | 4/1993 | |
| JP | H0578165 | U | 10/1993 | |
| JP | H09201016 | A * | 7/1997 | |
| KR | 20080086304 | A | 9/2008 | |
| NL | 6702222 | A | 8/1967 | |

OTHER PUBLICATIONS

Machine translation of JP-H09201016-A. (Year: 1997).*

Zhou, Tao; "Research on the Characteristics of Heat Dissipation and Carbon Particle flow in the Carbon Powder Collector for Hydrogenerator", "China Excellent Master's Thesis Database, Engineering Science and Technology II Series" 2021,(Issue 1) , C037-225., pp. 1-60.

Cao, Jianjun; "Analysis and resolution to the issue of high brush temperature of Guandi generator"; Mechanical & Electrical Technique of Hydropower Stations; Feb. 2021, vol. 44 (No. 2), pp. 40-42.

* cited by examiner

MOTOR-INTEGRATED RESOLVER TRANSFORMER SIMULATION DEVICE AND SIMULATION METHOD THEREOF

TECHNICAL FIELD

The present invention involves in the technical field of resolver transformers, specifically in a motor-integrated resolver transformer simulation device and the simulation method thereof.

BACKGROUND TECHNOLOGY

A resolver transformer is an electromagnetic transducer, also known as a synchronous resolver. A resolver transformer is a small AC motor for measuring angles to measure the angular displacement and angular velocity of a rotating object's rotating axis, which consists of a stator and a rotor. The stator winding acts as the primary side of the transformer and receives the excitation voltage. The rotor winding acts as the secondary side of the transformer and receives the induced voltage through electromagnetic coupling.

In the existing industrial processes, the resolver is widely used in the testing of motor controllers, where it is mounted on the motor, and the motor controller receives the signal feedback from the resolver to realize the commutation control of the motor.

Since motors are required in the development of motor controllers, and since motors are usually subjected to more extreme rotational conditions, the service life of the motors tends to be low, and frequent replacement of the motors results in an increased costs. Besides, existing motors are inconvenient to use because they need to be connected to the resolver.

For this reason, there is a great need to provide a resolver transformer simulation device with an integrated motor so as to effectively increase the service life of the motor and to avoid the increased cost caused by frequent replacement of motors.

Content of the Invention

A purpose of the present invention is to provide a motor-integrated resolver transformer simulation device and a simulation method thereof, in order to solve the technical problems mentioned in the background associated with the currently available technology.

In order to solve the above technical problem, the present invention provides a motor integrated resolver transformer simulation device comprising: a resolver transformer module and a motor module;

A rotor of the said motor module extending into a resolver rotor of the said resolver transformer; and The said resolver transformer is provided with a primary interface for the connection to an external motor controller; wherein The said resolver transformer is adapted to obtain rotary information of the motor module and transmit it to the motor controller; and The said motor module is connected to the said motor controller via the secondary interface to adjust the rotation speed and steering of the said motor module.

On the other hand, the present invention also provides a method of simulating a motor-integrated resolver, which comprises the following steps:

Employing the above-described motor-integrated resolver simulation device and execute the following steps:

Step S1, obtaining an excitation signal output from the resolver transformer circuit of the motor controller;

Step S2, obtaining a sine signal and a cosine signal of the resolver transformer;

Step S3, comparing the acquired excitation signals and sine signals with the cosine signals, obtaining a corresponding resolving angle or resolving speed;

Step S4, comparing the acquired rotation angle or rotation speed with a preset standard value of the rotation angle and the rotation speed;

Step S5, judging the qualification of the motor controller based on the comparison results.

The beneficial effect of the present invention is that the motor-integrated resolver simulation device and the simulation method thereof obtains the current sinusoidal and cosinusoidal signals of the motor module through the resolver transformer set up and determines whether there is a problem in the resolver circuit of the motor controller by comparing it with the excitation signal inputted by the motor controller, and, by improving the brush device of the motor module, thereby improving the service life of the motor module and reducing the testing cost.

Other features and advantages of the present invention will be set forth in the subsequent specification and, in part, will become apparent from the specification or will be understood by carrying out the present invention.

In order to make the above objectives, features and advantages of the present invention more apparent and understandable, preferred embodiments are hereinafter described in detail as follows, together with the accompanying drawings.

DESCRIPTION OF THE ACCOMPANYING DRAWINGS

In order to more clearly illustrate the technical solutions in the specific embodiments or currently available technology associated with the present invention, the accompanying drawings to be used in the description of the specific embodiments are briefly introduced below. Obviously, the accompanying drawings in the following description are only some of the embodiments of the present invention, and other drawings can be formulated based on these drawings by people with basic skills in the field without creative efforts.

In the figures:
resolver transformer 1,
primary interface 10,
transformer housing 11,
resolver stator 12, and
resolver rotor 13;
Motor module 2,
secondary interface 20,
motor housing 21,
motor rotor 22,
motor stator 23,
brush device 24,
brush holder 241,
commutator 242,
brush assembly 243,
brush 2431,
brush bushing 2432,
limiting assembly 244,
dustproof plate 2441,
top pushing block 2442,
negative pressure
adjusting plate 2443,
stopping block 2444,
spring 245, and
through-hole 246

Specific Implementation

In order to clarify the purpose, technical solutions and advantages of the embodiments of the present invention, the technical solutions of the present invention will be described clearly and completely in the following in conjunction with the accompanying drawings, and it is obvious that the described embodiments are part of the embodiments of the present invention, not all of the embodiments. Based on the embodiments in the present invention, all other embodiments achieved by a person with basic skills in the field without making creative efforts shall fall within the scope of protection of the present invention.

Embodiments

As shown in FIGS. 1 to 8, the present invention provides a motor-integrated resolver transformer simulation device comprising: a resolver transformer 1 and a motor module 2; a motor rotor 22 of the said motor module 2 extending into a resolver rotor 13 of the said resolver transformer 1; and a primary interface 10 for connecting with an external motor controller provided on said resolver transformer 1, wherein the said resolver transformer 1 is adapted to obtain rotation information of the motor module 2 and transmit it to the motor controller; and the said motor module 2 is connected to said motor controller via a secondary interface 20 to regulate the rotation speed and steering of the said motor module 2.

Figure 1:
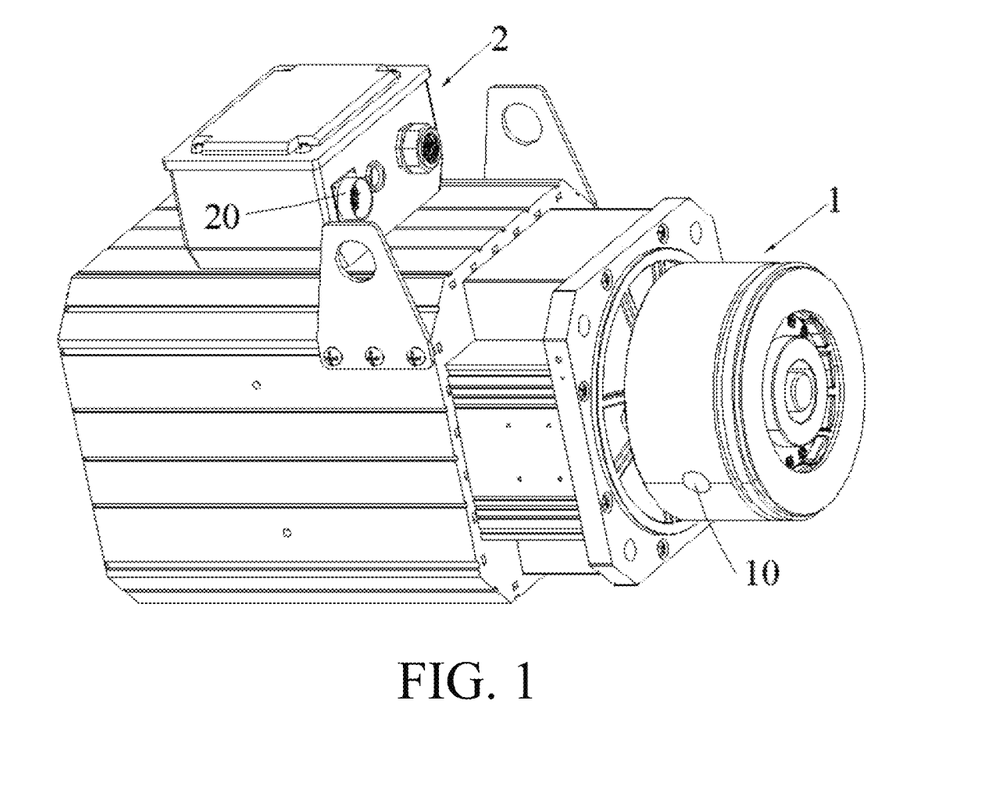
FIG. 1 is a three-dimensional view of the motor-integrated resolver simulation device of the present invention.
Figure 2:
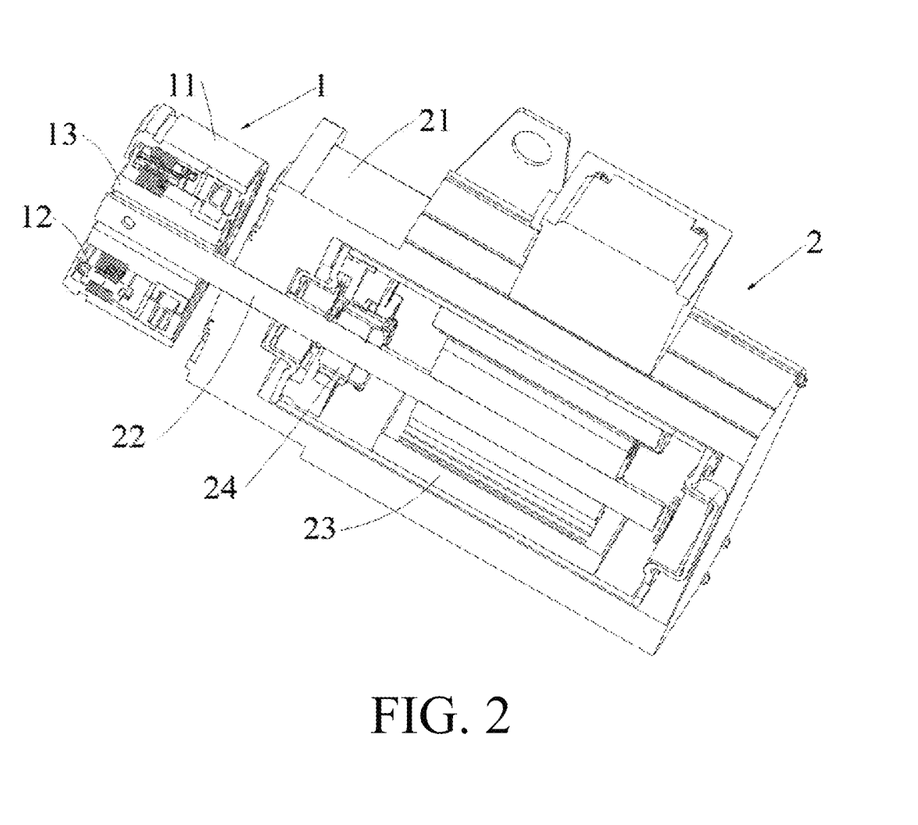
FIG. 2 is a cross-sectional structural schematic view of the internal structure of the motor-integrated resolver transformer simulation device of the present invention.

In this embodiment, the current sine and cosine signals of the motor module 2 are obtained by the resolver transformer module 1 provided, and by comparing them with the excitation signals inputted by the motor controller, so as to determine whether there is any problem with the resolving transform circuit of the motor controller, and, by improving the brush device of the motor module 2, so as to improve the service life of the motor module 2, and to reduce the detection cost.

In this embodiment, said resolver transformer 1 comprises: a transformer housing 11 and a resolver stator 12; wherein said resolver rotor 13 and said resolver stator 12 are both disposed within said transformer housing 11; and said resolver stator 12 is socketed at the periphery of said resolver rotor 13.

In this embodiment, said motor module 2 comprises: a motor housing 21 and a motor stator 23; wherein said motor stator 23 and said motor rotor 22 are both disposed within said motor housing 21; said motor stator 23 being socketed at the periphery of said motor rotor 22.

In this embodiment, said motor module 2 further comprises: brush means 24; said brush means 24 is provided inside said motor housing 21 and is in contact with said motor rotor 22 to conduct external current to the motor rotor 22.

Figure 3:
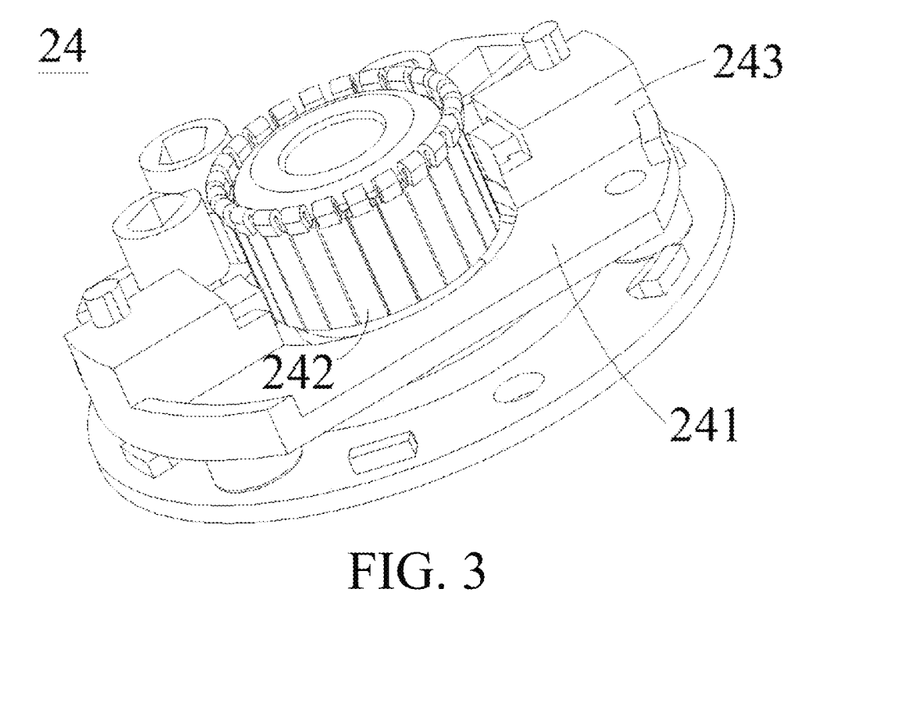
FIG. 3 is a three-dimensional structural schematic view of a brush device in the motor-integrated resolver transformer simulation device of the present invention.

In this embodiment, said brush device 24 comprises: a brush holder 241, a commutator 242 and a brush assembly 243; wherein said brush holder 241 is provided on the said motor housing 21; the said commutator 242 is socketed to the said motor rotor 22; and said brush assembly 243 is provided on the said brush holder 241 and is in contact with the said commutator 242.

In this embodiment, by setting the said brush holder 241 on the said motor housing 21, thereby enabling the brush assembly 243 set on the brush holder 241 to contact the commutator 242. The external current is directed to the commutator 242 via the brush assembly 243.

Figure 6:
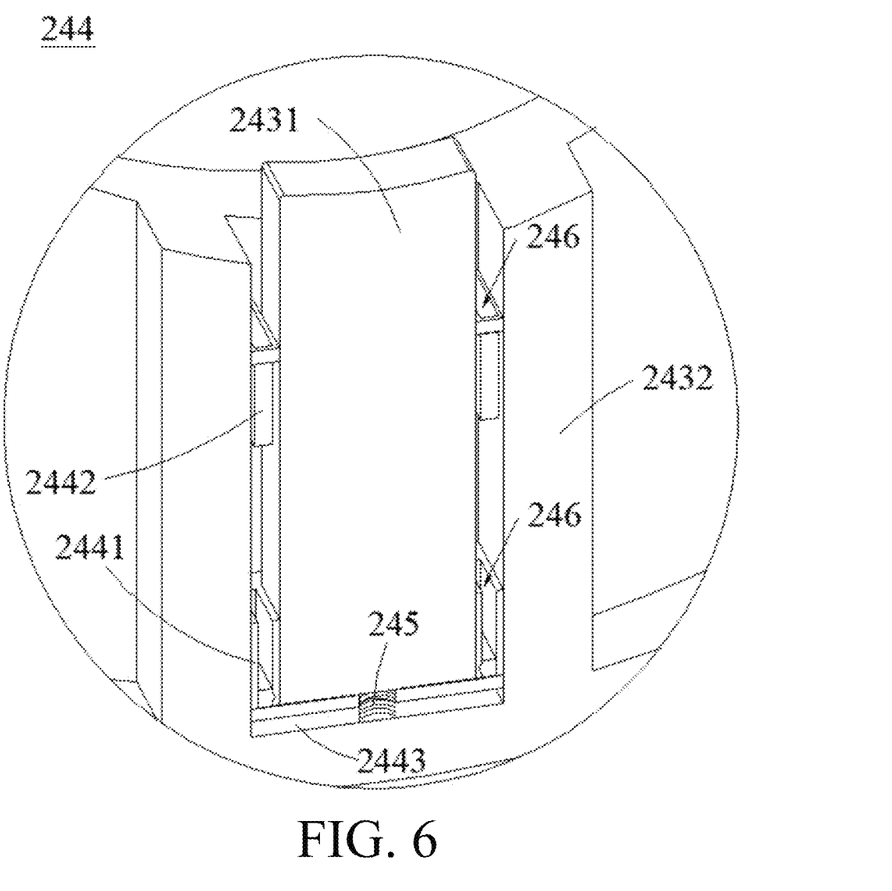
FIG. 6 is a three-dimensional view of a brush assembly in the motor-integrated resolver transformer simulation device of the present invention.

In this embodiment, the said brush assembly 243 comprises a brush 2431 and a brush sleeve 2432, wherein the said brush sleeve 2432 is provided on the said brush holder 241, and the said brush 2431 is inserted within the said brush sleeve 2432, wherein the said brush sleeve 2432 is further provided with a limiting assembly 244 for limiting and supporting the said brush 2431.

In this embodiment, the brushes 2431 are fixed and its movement is limited and supported by the limit assembly 244 provided within the brush sleeve 2432, effectively avoiding the brushes 2431 from shaking and being damaged.

Figure 4:
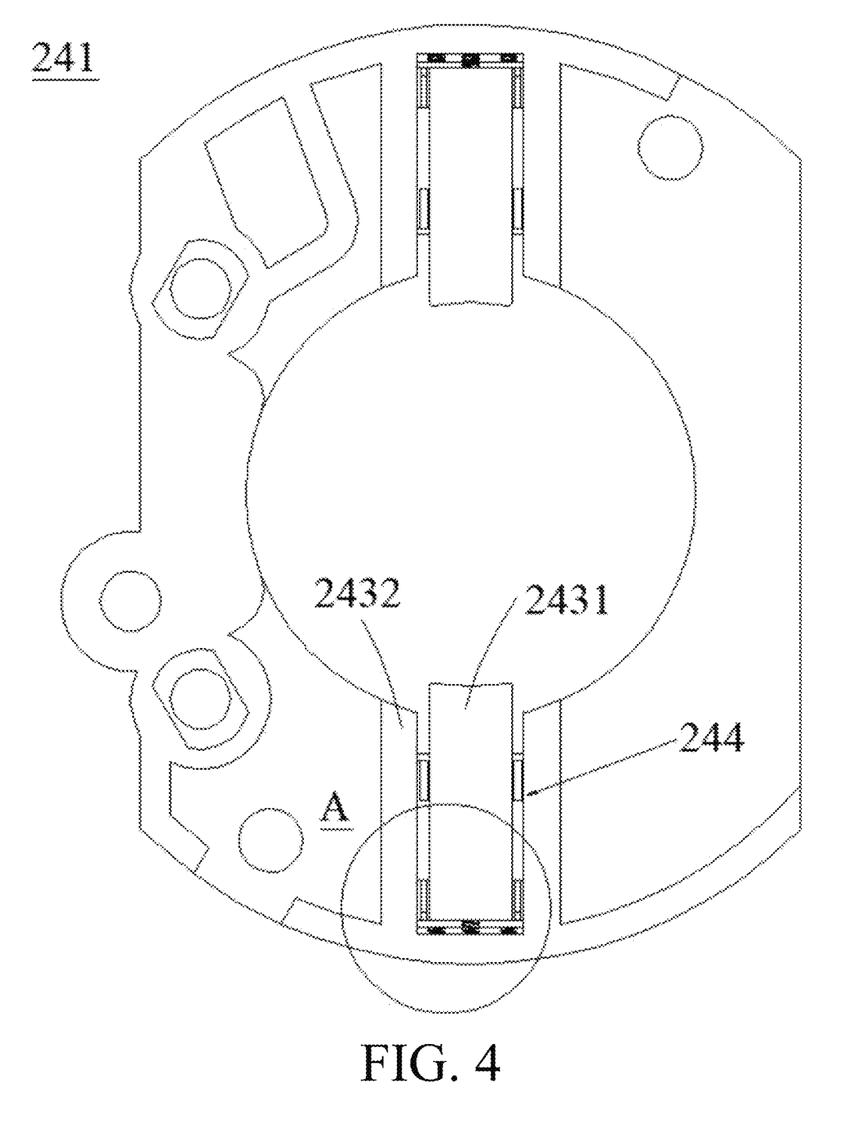
FIG. 4 is a front view of a brush holder in the motor-integrated resolver transformer simulation device of the present invention.
Figure 5:
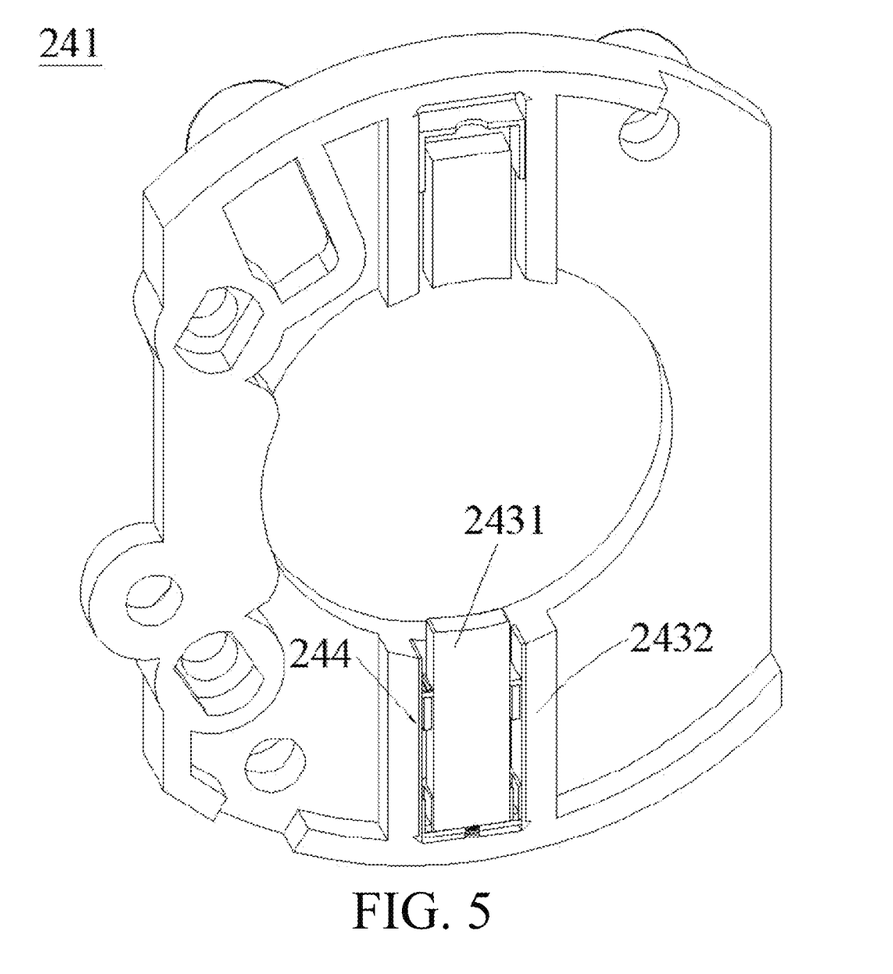
FIG. 5 is a three-dimensional view of a brush holder in the motor-integrated resolver transformer simulation device of the present invention.
Figure 7:
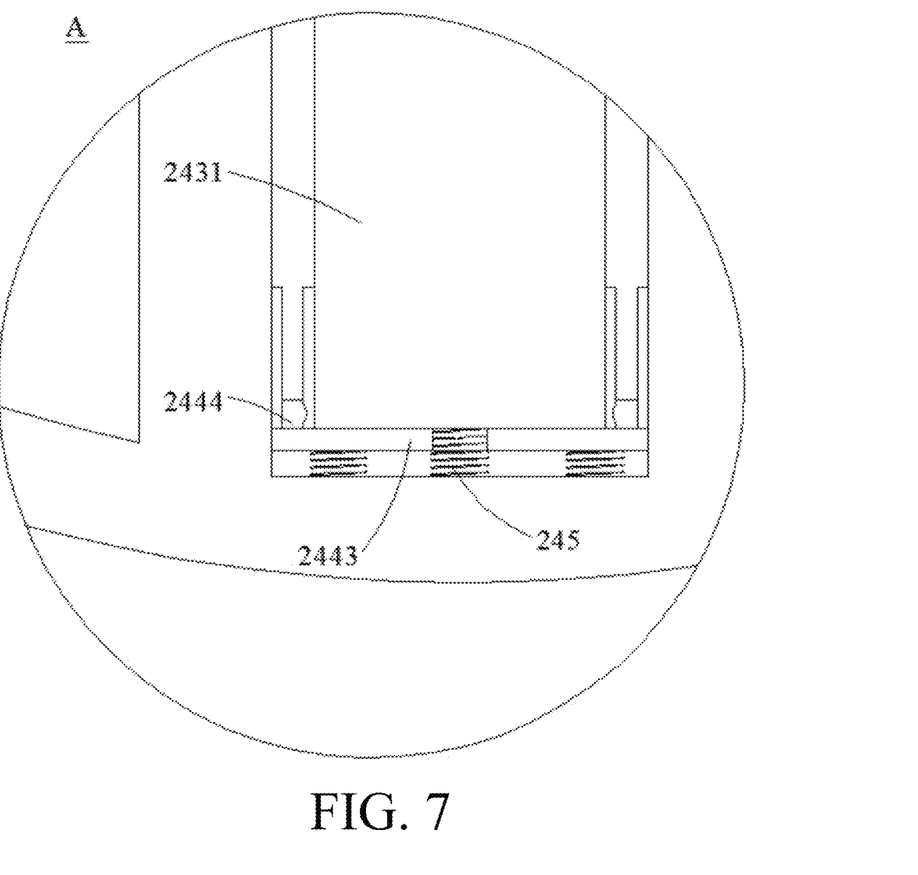
FIG. 7 is an enlarged schematic view of the structure at A in FIG. 4 of the present invention.
Figure 8:
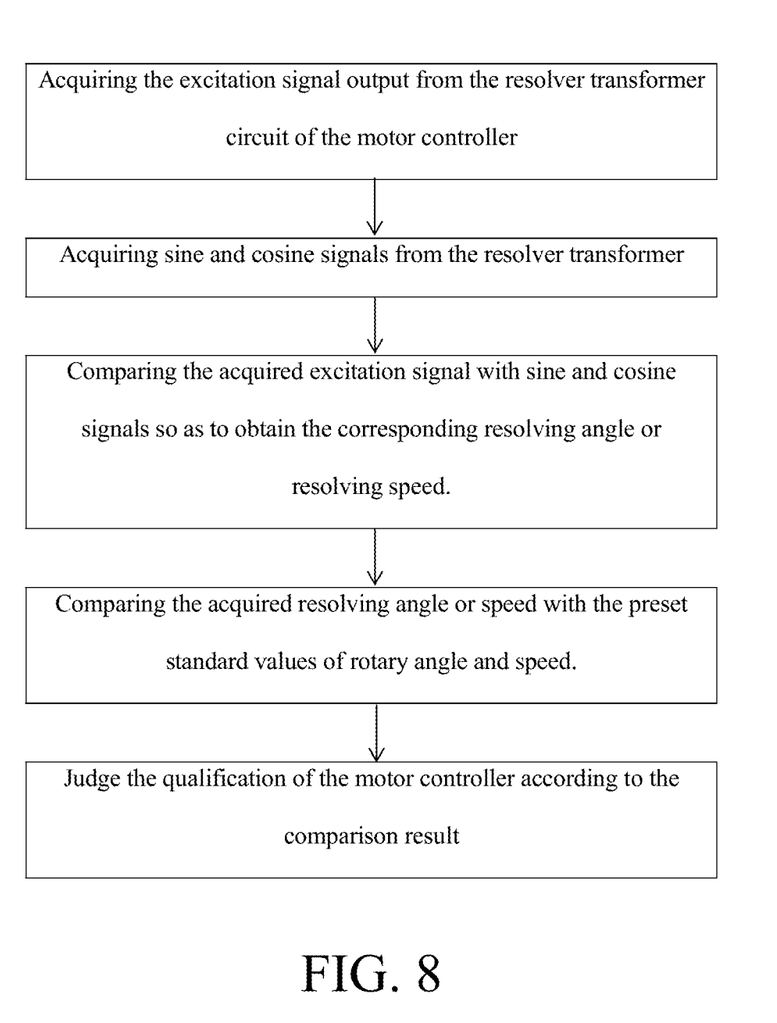
FIG. 8 is a schematic flow diagram of a method of simulating an integral resolver transformer of a motor of the present invention.

In this embodiment, the said limiting assembly 244 comprises a dustproof plate 2441 socketed at the bottom of the said brush 2431 and a top pushing block 2442 set on the inner wall of said brush holder 241, wherein said dustproof plate 2441 is provided with wire holes at the bottom for wires to be connected out of said brush 2431; and a spring 245 is provided at the bottom of said dustproof plate 2441 to push the said brush 2431 upwards. push said brush 2431 upward; said ejector block 2442 is adapted to push against a side wall of the said brush 2431; and when the said brush 2431 moves upward to its highest point, the said top pushing block 2442 is inserted into the said dust plate 2441 to increase the pushing force against the side wall of the brush 2431.

Since the brushes 2431 need to be in contact with an external power source via a power cord, the brushes 2431 are usually provided with copper conductors at the bottom for power conduction, and since the brushes 2431 are always in a state of wear and tear, the prior art will push the brushes 2431 upwardly through the provision of springs 245 or torsion springs or the like, always keeping the end face of the brushes 2431 in contact with the commutator 242, but the conventional electric brushes are always in contact with the commutator 242. but the conventional brush 2431 is usually directly inserted in the brush sleeve 2432, which causes the brush 2431 to be offset during the upward movement, resulting in uneven wear of the brush 2431, further leading to damage of the motor, and the carbon powder under the abrasion will fall out of the gap between this brush sleeve 2432 and the brush 2431, resulting in the movement of the brush 2431 being obstructed.

In this embodiment, the bottom of the brush 2431 is limited by the dustproof plate 2441 located at the bottom of the brush 2431, and the sidewall of the brush 2431 is pushed up by the top push block 2442, which ensures that the brush 2431 is always moved upward in the vertical direction, and at the same time, compared to the existing technology in which the brush 2431 is inserted directly into the brush sleeve 2432, the dustproof plate 2441 and the top push block 2442 are used to avoid direct contact between the brush 2431 and the brush sleeve 2432, and avoid the carbon powder adhering to the brush sleeve 2432 during the movement of the brush 2431. 2441 and the top push block 2442, avoiding direct contact between the brush 2431 and the brush sleeve 2432, and avoiding the carbon powder falling from the wear and tear of the brush 2431 during the movement of the brush 2431 from adhering to the brush sleeve 2432, thereby ensuring that the brush sleeve 2432 always remains in a clean state.

In addition, when said brush 2431 moves up to the highest point, i.e., the situation corresponding to this time shall be that the brush 2431 to reach its use node (the brush 2431 is a consumable, and generally the brush 2431 will not be completely used up, and some will be reserved, and when it reaches the preset reserved length, this time is defined to be the use node), and at this time, there is less of the brush 2431 remaining, and therefore, the commutator 242 to the brushes 2431 will aggravate the shaking of the brushes 2431, etc. At this time, the top push block 2442 is inserted into said dustproof plate 2441, thereby further increasing the clamping strength of the brushes 2431 to avoid the brushes 2431 from breaking, and the use of this method can effectively avoid the brushes 2431 from breaking when the remaining brushes 2431 are less.

In this embodiment, the dustproof plate 2441 and the and the said top pushing block 2442 are both provided with the hole 246; the lower position of the said dustproof plate 2441 is provided with negative pressure adjusting plate 2443; on top of the negative pressure adjusting plate 2443, the stopping block 2444 is provided, which is to be embedded into the hole 246 of the dustproof plate 2441. When the said top pushing block 2442 is inserted into the dustproof plate 2441, the said stopping block 2444 disengages from the said dustproof plate 2441 and descends, thereby generating a suction airflow that sucks in the carbon powder ground down by from brush 2431.

In this embodiment, the through holes 246 provided in said thrust block 2442 and said dustproof plate 2441 are used to collect the carbon powder ground down by the brush 2431. Specifically, the carbon powder ground down on the surface of the brush 2431 will fall into the gap between the brush 2431 and the brush sleeve 2432, and the through holes 246 are blocked by the negative pressure regulating plate 2443 at the beginning of the setup, thus avoiding the carbon powder from entering through the through holes 246. The carbon powder enters into the bottom of the dustproof plate 2441 through the through-hole 246 and adheres to the copper conductor and causes a short circuit, and secondly, when the said top push block 2442 is inserted into the dustproof plate 2441, i.e., the top push column set below the through-hole 246 of the top push block 2442 is inserted into the through-hole 246 of the dustproof plate 2441, the top push plate movably set at the through-hole 246 of the dustproof plate 2441 is squeezed and moved in the direction of moving close to the brush 2431 in the direction of the through-hole 246, thereby making the through-hole 246 larger, causing the negative pressure adjustment plate 2443 to be detached from the through-hole 246 and fall, at which time, the negative pressure adjustment plate 2443 is equivalent to the effect of the rubber stopper in the syringe, thereby generating a negative pressure airflow that draws the toner located in the through-hole 246 of the dust-proof plate 2441 to the underside of the dust-proof plate 2441, thereby avoiding the toner from being brought out of the carbon brushes after they are moved upward to a high point, adhering to the commutator 242 and causing secondary contamination.

In this embodiment, as a preferred method of activity of the dustproof plate 2441 and the negative pressure adjusting plate 2443, both of them are provided with a spring 245 at the bottom, with the difference that the spring 245 at the bottom of the dustproof plate 2441 is in a compressed state at the beginning of the spring 245, and the spring 245 at the bottom of the negative pressure adjusting plate 2443 is in a normal state at the beginning of the spring 245.

On the other hand, the present invention also provides a simulation method of a motor-integrated resolver transformer, comprising: adopting the above-described motor-integrated resolver transformer simulation equipment, and including the following steps:

Step S1, obtaining an excitation signal output from the resolver transformer circuit of the motor controller;

Step S2, obtaining a sine signal and a cosine signal of the resolver transformer 1;

Step S3, comparing the acquired excitation signals and sine signals with the cosine signals, obtaining a corresponding resolving angle or resolving speed;

Step S4, comparing the acquired rotation angle or rotation speed with a preset standard value of the rotation angle and a standard value of the rotation speed;

Step S5, judging the qualification of the motor controller based on the comparison results.

In summary, the motor integrated resolver transformer simulation device of the present invention and the simulation method thereof obtains the current sine and cosine signals of the motor module 2 through the resolver transformer module 1 provided therein, and judges whether there is a problem with the resolving transform circuit of the motor controller by comparing it with the excitation signals inputted by the motor controller, and, by improving the brush device 24 of the motor module 2, thereby improving the service life of the motor module 2 and reducing the testing cost.

Each of the devices selected in the present application (parts with no specific structure stated) is a common standard part or a part known to the person skilled in the art, and its structure and principle are known to the person skilled in the art through technical manuals or through conventional experimental methods. Moreover, the software program involved in this application is prior art, and this application does not involve any improvement of the software program.

In the description of the embodiments of the present invention, the terms "mounted", "connected", "connected" are to be understood in a broad sense, unless otherwise expressly specified and limited, e.g., it can be a fixed connection, a detachable connection, or an integral connection; it can be a mechanical connection or an electrical connection; it can be a direct connection or an indirect connection through an intermediate medium; it can be a connection within two elements. For example, it may be a fixed connection, a removable connection, or a connection in one piece; it may be a mechanical connection or an electrical connection; it may be a direct connection or an indirect connection through an intermediate medium; it may be a connection within two elements. For those of ordinary skill in the art, the specific meaning of the above terms in the context of the present invention may be understood in specific cases.

In the description of the present invention, it is to be noted that the terms "center", "top", "bottom", "left", "right", "vertical", "horizontal", "inside", "outside", and the like, "Outside" and the like indicate orientations or positional relationships based on those shown in the accompanying drawings, and are intended only to facilitate description of the present invention and to simplify the description, and are not intended to indicate or imply that the device or element referred to must have a particular orientation, be constructed and operated with a particular orientation, and therefore are not to be construed as a limitation of the present invention. Furthermore, the terms "first," "second," and "third" are used for descriptive purposes only and are not to be construed as indicating or implying relative importance.

In the several embodiments provided in this application, it should be understood that the systems, devices, and methods disclosed may be realized in other ways. The above-described embodiments of the device are merely schematic. For example, the division of the units described, is merely a logical functional division, and may be divided in other ways when actually implemented. Alternatively, for example, multiple units or components may be combined or may be integrated into another system, or some features may be ignored, or not implemented. Moreover, the coupling, direct coupling or communication connection between components shown or discussed may be either an indirect coupling or connections through a few relaying communication interfaces, devices or units, by either electrical, mechanical or other means.

The said units illustrated as separated components may or may not be physically separated, and components shown as units may or may not be physical units, i.e., they may be located in a single place or they may be distributed to a plurality of network locations. Part or all of these units may be selected to fulfill the purpose of this embodiment scheme based on the requirement of the site.

In addition, the various functional units in various embodiments of the present invention may be integrated in a single processing unit, or each unit may physically exist separately, or two or more units may be integrated in one single unit.

Taking the above desirable embodiments based on the present invention as a revelation, by means of the above-described contents, it is entirely possible for the relevant staff to make diverse changes as well as modifications in premise of not deviating from the technical ideas of the present invention. The technical scope of the present invention is not limited to the contents of the specification, but must be determined in accordance with the scope of the claims.

The invention claimed is:

1. A motor-integrated resolver transformer simulation device, comprising a resolver transformer module and a motor module,
wherein:
the resolver transformer comprises a transformer housing, a first rotor, a first stator, the first stator being disposed about the first rotor,
the motor module comprises a motor housing, a second rotor, a second stator, and a brush element, wherein:
the second rotor, the second stator, and the brush element are disposed in the motor housing,
the second stator is disposed about the second rotor,
the brush element comprises a brush holder affixed to the motor housing, a commutator affixed to the second rotor, and a brush assembly comprising a brush and a brush sleeve,
the brush sleeve being provided on the brush holder and sleeving over the brush,
the brush sleeve being further provided with a limiting assembly for limiting and supporting of the brush,
the limiting assembly comprising a dustproof plate set on a radially outer side of the brush and a pushing block pushing against an inner wall of the brush holder,
the dustproof plate being provided with a wire hole at a radially outer side of the dustproof plate for threading wires for the brush and a spring that pushes the brush radially inward,
when the brush is moved to a radially innermost point, the pushing block is inserted into the said dustproof plate to increase a pushing force exerted on the side wall of the brush;
wherein:
the first rotor is connected to the second rotor,
the resolver transformer is provided with a primary interface configured to be connected with a motor controller and to obtain rotatory information of the motor module and transmit the rotatory information to the motor controller, and
the motor module is connected to the motor controller via a secondary interface.

2. The motor-integrated resolver transformer simulation device of claim 1, wherein:
each of the dustproof plate and the push block comprises a through-hole, and
a negative pressure adjusting plate having a stopping block configured to snap into the through-hole of the dust-proof plate,
when the pushing block is inserted into the dust-proof plate, the stopping block is detached from the said dust-proof plate, thereby generating a suction that sucks in carbon powder ground down from the brush.

3. A method for simulating a motor-integrated resolver transformer of claim 1, comprising:
Step S1, obtaining an excitation signal output from the motor controller;
Step S2, obtaining a sine signal and a cosine signal of the resolver transformer;
Step S3, comparing the acquired excitation signals and sine signals with the cosine signals, and acquiring a corresponding resolving angle or resolving speed;
Step S4, comparing the acquired rotation angle or rotation speed with a preset standard value of resolving angle and a standard value of resolving speed; and
Step S5, determining qualification of the motor controller according to the results of the comparison.

* * * * *